J. Backus,
Derrick.

No. 83,018.  Patented Oct. 13, 1868.

Witnesses:
Theo Fusche
Wm Truvin

Inventor:
Jas Backus
Per Mumy & Co
Attorneys

JOSEPH BACKUS, OF GREENVALE, ILLINOIS.

Letters Patent No. 83,018, dated October 13, 1868.

IMPROVED DEVICE FOR UNLOADING HAY.

The Schedule referred to in these Letters Patent and making part of the same.

*To all whom it may concern:*

Be it known that I, JOSEPH BACKUS, of Greenvale, Jo Daviess county, Illinois, have invented a new and improved Device for Unloading Hay; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

This invention relates to a device for unloading hay from wagons, upon stacks, and consists, first, in the construction and arrangement of a derrick, which can be used for the purpose of transferring the hay from the wagon; second, the invention consists in the device for holding the hay, while the same is being transferred from the wagon to the derrick.

A represents an upright post, which is secured in a suitable bar, B, and to the top of which a cross-bar, C, is secured.

To the top of the bar C is hinged, by means of a universal joint, $a$, a beam, D, of sufficient length, so that between the post A and the front end of D, ample room may be left for the stack.

Figure 1:
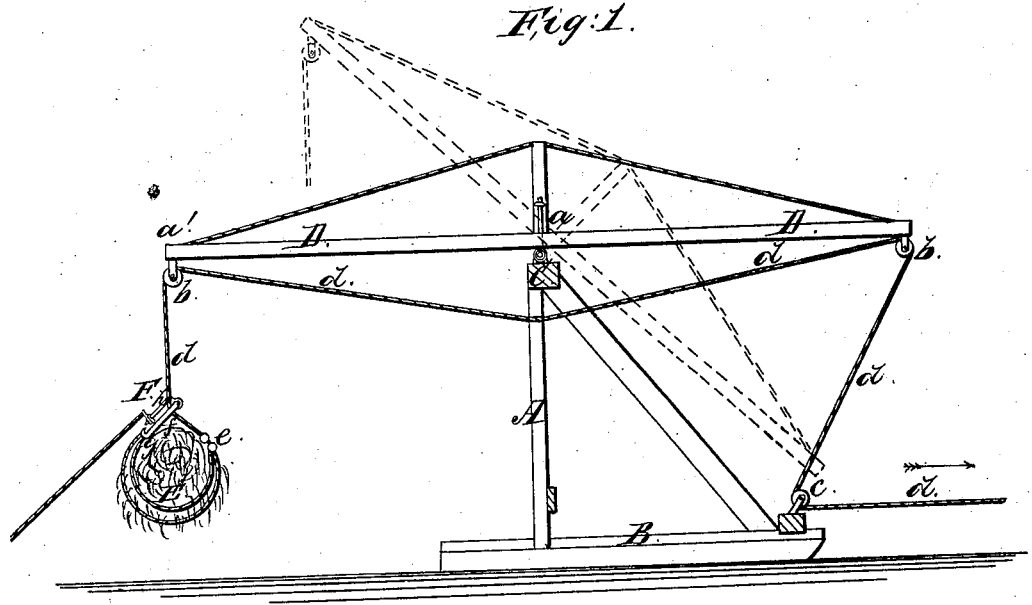
Figure 1 represents a side elevation, partly in section, of my invention.

The front end, $a'$, of the beam D, is above the wagon, from which the hay is to be loaded, and the beam is then in a level position, as shown in fig. 1.

The rear end of the beam is as long as the front end, so that the beam will be balanced by its own weight.

On each end of the beam is arranged a pulley, $b\ b$, over which a chain, $d$, passes, and on the bed-plate B is secured, below the rear end of the beam, a pulley, $c$.

The chain $d$ is carried from the rear end of the beam, down around the pulley $c$, and to its rear end, $e$, is secured a horse, or other moving-power.

The hinge $a$ is so constructed that the beam can swing in a horizontal direction around its vertical axis, or in a vertical direction, around a horizontal axis; or, in other words, either end of the beam can be swung up and down, and to either side, as may be desired.

E is a circular strap, of which any desired number are side by side, upon and across the wagon, before the same is loaded, and after a certain quantity of hay is placed upon the wagon, another row of such loops or straps is laid over the hay and across the wagon, and new hay thrown thereon.

When the hay is to be unloaded from the wagon, the derrick is so placed that the front end of the beam D will be held above the wagon, the place for the stack being between the post A and the wagon. The beam is to be level.

A hook, $e$, is secured to the front end of the chain $d$, and is hooked into one end of the strap, while a separate hook, F, is secured in the opposite end of the strap E, on the other side of the wagon, and the hook F is then also hooked over the chain $d$, as shown in fig. 1, so that the hay which was lying upon the strap is all enclosed in it, and can be elevated from the wagon.

The horse pulls on the rear end of the chain, and thereby the hay is not only elevated above the wagon, but the whole front end of the beam is raised, as is clearly shown by red lines in fig. 1.

The hay will thus be suspended above the spot where the stack is or is to be. By releasing the hook F from the chain $d$, the hay will be discharged upon the stack.

Figure 2:
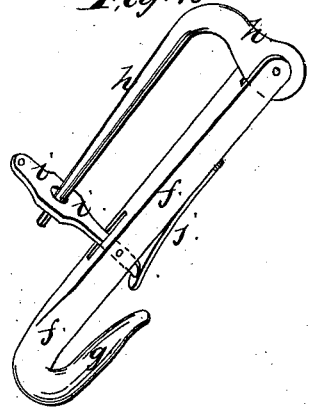
Figure 2 is a detail view, on an enlarged scale, of the latch for holding the hay.

The hook F is shown enlarged in fig. 2.

It consists of a straight shank, $f$, provided with a fixed hook, $g$, at one end, while an L-shaped bar, $h$, is pivoted to its other end.

The extreme end of this bar $h$ can be secured in a catch, $i$, which is pivoted in about the centre of the shank $f$, as shown, passing through a slot in the said shank, as shown.

A spring, $j$, keeps the catch $i$ in any desired position.

When to be applied, the hook $g$ is secured in the strap, the elbow $h$ is laid around the chain, and is then locked in the catch $i$.

By pulling a string or rope, which is attached to the extreme end of the catch $i$, (see fig. 1,) the same is released from the chains, and with it the whole hook F, whereby the hay is discharged.

Having thus described my invention,

What I claim as new, and desire to secure by Letters Patent, is—

The derrick A B C, in combination with the beam D, chain $d$, and hooks $e$ and F, all made and operating substantially as herein shown and described, and for the purpose of unloading hay from wagons, as set forth.

JOSEPH BACKUS.

Witnesses:
  WILLIAM F. TAYLOR,
  JAMES BAYNE.